July 7, 1959  J. G. MARTIN  2,893,519
BRAKE ASSEMBLY
Filed Sept. 27, 1954  3 Sheets-Sheet 1

INVENTOR.
JOHN G. MARTIN
BY Cecil J. Arena

ATTORNEY

July 7, 1959

J. G. MARTIN 2,893,519

BRAKE ASSEMBLY

Filed Sept. 27, 1954

INVENTOR.
JOHN G. MARTIN
BY Cecil J Arena
ATTORNEY

United States Patent Office 2,893,519
Patented July 7, 1959

2,893,519

BRAKE ASSEMBLY

John G. Martin, South Bend, Ind., assignor to Bendix Aviation Corporation, South Bend, Ind., a corporation of Delaware Application September 27, 1954, Serial No. 458,361

4 Claims. (Cl. 188—71)

The present invention relates to brakes, and more specifically to disc brakes wherein one or more of the discs is composed of a plurality of separate segments, as disclosed in my application Serial No. 147,100 now Patent No. 2,683,504, granted July 13, 1954.

When segmented rotors are used on aircraft brakes, the effect of centrifugal force on the segments presents a serious problem, especially in the case of aircraft landing at high speeds. The centrifugal force has a tendency to throw the segments of the rotor against the rotor drive keys causing the two to bind as the bearing load increases. When this occurs the discs of the brake cannot slide in a free manner axially along the driving keys into frictional contact with the other discs. At times, due to this binding effect, the back discs fail to come into contact with the adjoining discs, thus causing the friction load to be taken on only part of the discs. As a result, these discs get overheated and become ineffective.

It is an object of the invention to construct the disc elements of a segmented rotor so that centrifugal action will not interfere with brake operation.

Another object of the invention is to build a segmented rotor having disc segments which are freely supported therein and are out of frictional engagement with the torque transmitting members carried by the wheel, thereby facilitating lateral movement of the rotor.

A further object of this invention is to provide a structure for segmented rotors which will overcome the detrimental effects of centrifugal force and thereby allow the friction load to be distributed uniformly over all of the discs.

Other objects and advantages of the present invention will become apparent during the course of the following description, reference being had therein to the accompanying drawings.

Figure 1:
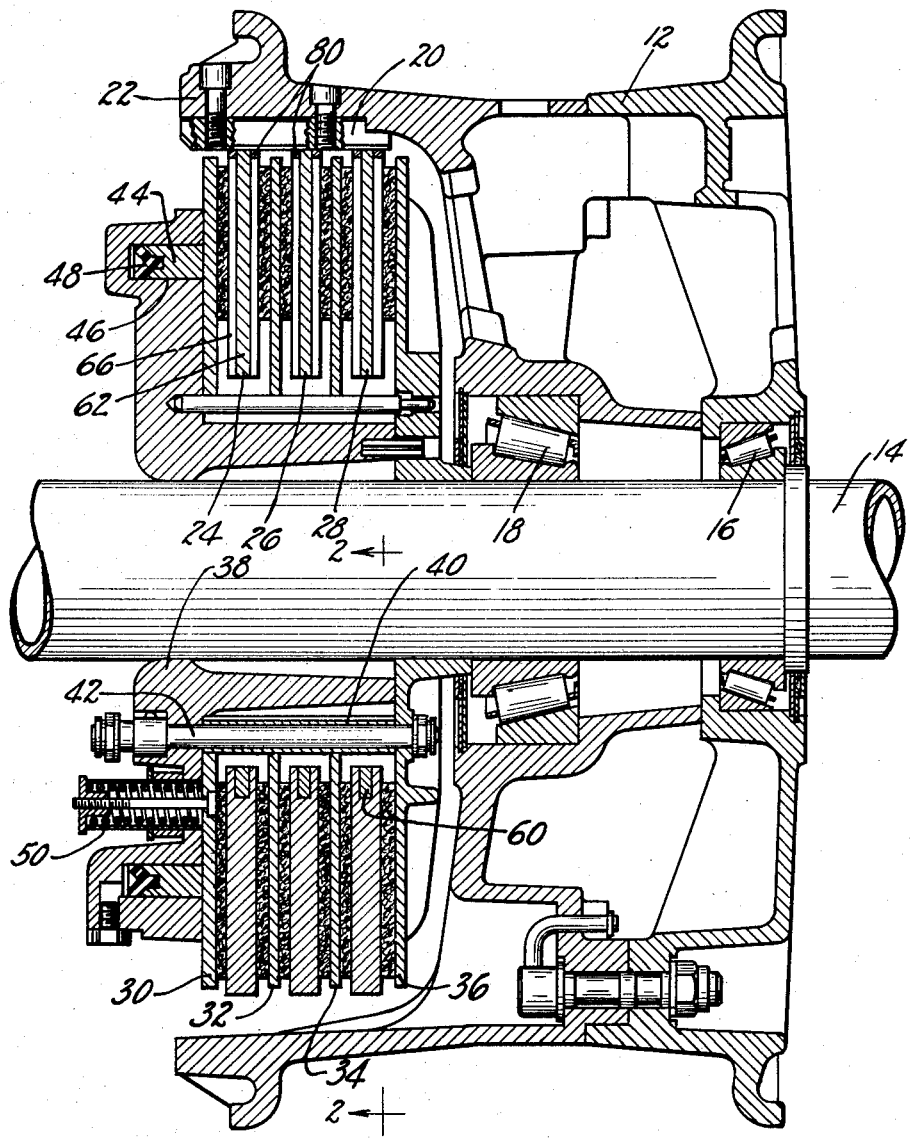
Figure 1 is a vertical section taken through a wheel and brake assembly incorporating my invention.
Figure 2:
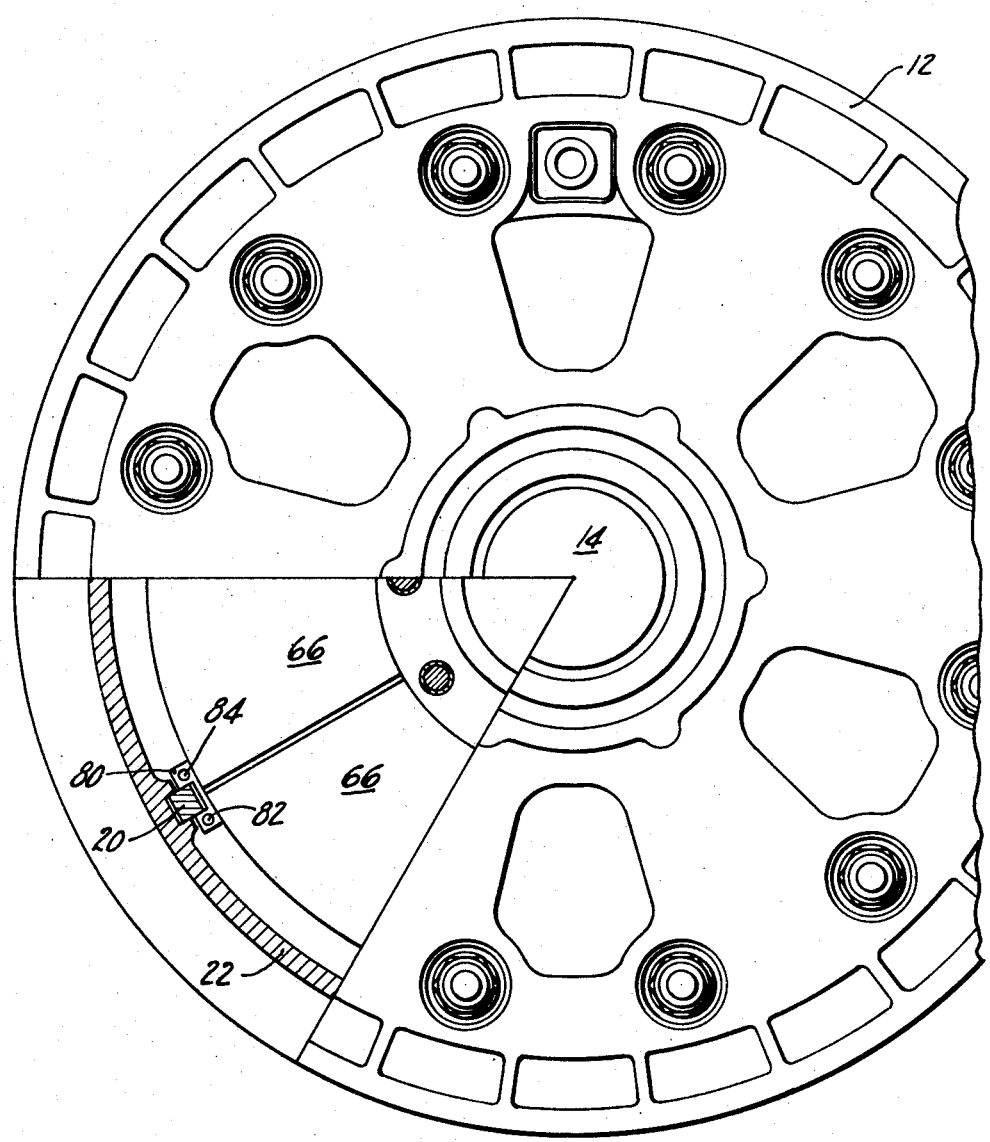
Figure 2 is a vertical side view of the wheel and brake assembly with a partially broken-away section taken on line 2—2 of Figure 1.

The disc brake assembly of Figures 1 and 2 comprises, in general, a wheel 12 rotatably mounted on a non-rotatable axle 14, the friction of rotation being minimized by bearings 16 and 18. A plurality of keys or torque-transmitting members 20 are secured to an axially extending flange 22 of the wheel for driving engagement with rotors 24, 26, and 28. The particular construction of the rotors will be described in detail hereinafter. In the illustrated embodiment there are four lined non-rotatable discs 30, 32, 34 and 36, which constitute the means for slowing the rotation of the wheel after being moved axially into frictional contact with the rotating discs. A supporting or torque member 38 secured to a non-rotatable element, such as the axle 14, supports the non-rotatable discs and prevents them from rotating. The torque member 38 has a plurality of circumferentially spaced torque sustaining keys or hollow bars 40, which serve to support the non-rotatable discs, to maintain them against rotation, and to take the torque thereof during the time they are in contact with the rotatable discs. Bolts 42 extending through the hollow bars 40 firmly hold non-rotatable disc 36 against the edge of the torque member 38. The discs 30, 32, and 34 are keyed to the hollow bars 40 so that they are incapable of circumferential or rotational movement relative to the bars, but they are capable of lateral or axial movement along the length of the bars. Likewise, the rotating discs 24, 26, and 28 are capable of axial movement along the keys 20, said keys extending into grooves or slots 43 in the periphery of the discs.

Bearing against disc 30 is an annular piston 44 reciprocable in an annular chamber 46 which is formed in the torque member 38. An annular resilient seal 48 is provided in the chamber 46 to prevent loss of fluid. Admission of hydraulic fluid under pressure into chamber 46 causes the piston to move and thus force the adjacent discs into contact with one another. The disc 36 being unable to move axially serves as a wall against which the axially movable discs are compressed. The frictional force between the rotating and non-rotating discs causes the torque of the rotating wheel 12 to be transmitted to the stationary torque member 38, thus causing the wheel to tend to stop rotating. A plurality of circumferentially spaced springs 50 serve to return the brake discs to released position when the hydraulic pressure is removed.

Figure 3:
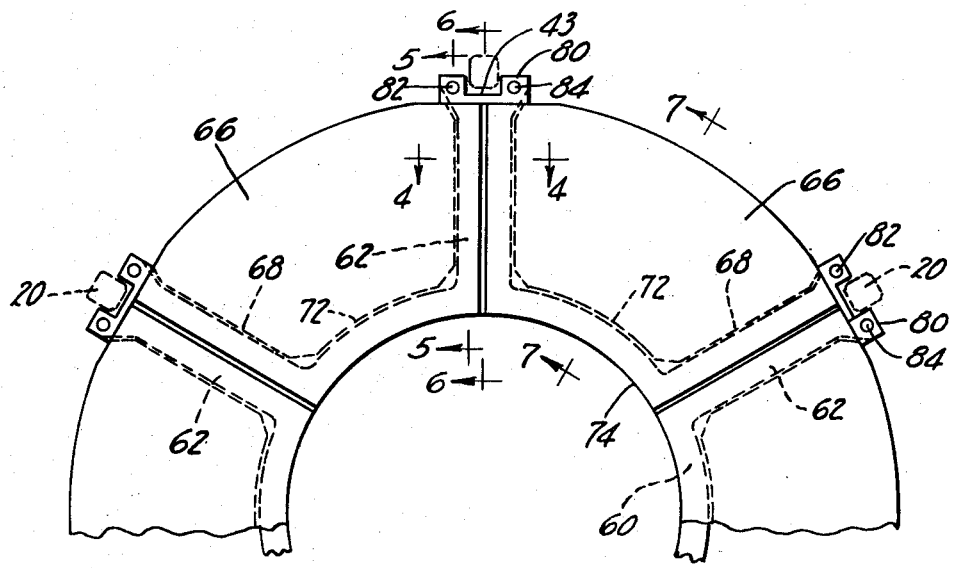
Figure 3 shows the construction of one of the segmented rotors shown in Figures 1 and 2.

Each of the brake rotors 24, 26, and 28 is comprised of a metal spider formed by an annular retainer 60 and a plurality of integral circumferentially spaced radially extending spacers or torque projections 62, as shown in Figure 3. The outer extremities of the projections 62 are flared for added strength and are formed with the grooves or slots 43 which slidably engage the respective axially extending torque transmitting members or drive keys 20.

Figure 4:
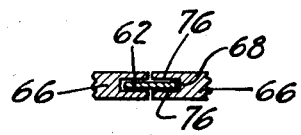
Figure 4 is a fragmental sectional view taken substantially on section line 4—4 of Figure 3.
Figure 7:
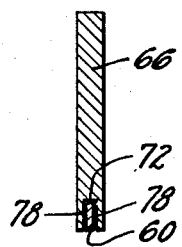
Figure 7 is a sectional view taken on line 7—7 of Figure 3.

A plurality of arcuate brake disc segments 66, usually formed of metal, are fitted between the projections 62. Each segment 66 is provided with radially extending grooves or slots 68 on each end edge, as shown in Figure 4, and a groove or slot 72 along its inner arcuate surface 74, as shown in Figure 7. Sides 76 of the groove 68 straddle the radial edges of the respective projections 62, and sides 78 of the inner groove 72 straddle the annular retainer 60. The slots are of such a depth as to permit thermal expansion of the respective segments.

Figure 5:
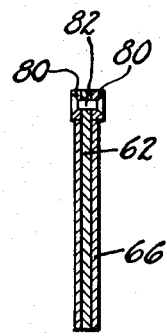
Figure 5 is a sectional view taken on line 5—5 of Figure 3.
Figure 6:
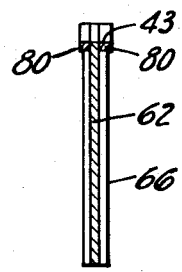
Figure 6 is a sectional view taken on line 6—6 of Figure 3.

A plurality of fastening members 80 are secured to the outer extremities of the flared projections 62 by two rivets 82 and 84, as shown in Figures 3 and 5. The members 80 prevent the segments 66 from moving radially outward towards the wheel 12, thus overcoming the effect of centrifugal force which causes such movement. As shown in Figures 3 and 6, the fastening members 80 are also formed with the grooves or slots 43 therein, and slidably engage respective axially extending driving keys 20 in conjunction with the flared projections 62 of the spider. The members 80 are made of strong material so as to be able to withstand the centrifugal forces exerted thereon by the segments. By preventing outward movement of the segments the necessary clearance is maintained between the driving keys and the members at all times, thus obviating the difficulties of binding which formerly resulted between the keys and the segments. This is possible since the keys are in contact only with the fastening members 80 and flared projections 62 rather than the segments themselves as in previous designs of segmented rotors. Contact is only on the sides of the fastening members and the sides of the projections, thereby allowing free axial movement.

Although a particular embodiment of my invention has been described, it will be understood by those skilled in the art that the objects of the invention may be attained by the use of construction different in certain respects from that disclosed without departing from the underlying principles of the invention.

I claim:

1. A wheel and brake assembly comprising a rotatable wheel a plurality of circumferentially spaced axially extending driving keys carried by said wheel, a plurality of brake rotors, a plurality of brake stators engageable with the rotors and prevented from rotation by anchoring on a non-rotatable member, said brake rotors each comprised of an annular retainer, a plurality of circumferentially spaced radially diverging projections extending from said retainer, said projections being flared at the ends to provide said projections with a cross-sectional area which is largest at the flared ends thereof, said flared ends having a slot formed therein, a plurality of circumferentially arranged rotor segments peripherally mounted on said retainer between said projections, said segments being slotted on the bottom and ends so that each end slot receives one edge of a respective projection and the bottom receives the edge of the annular retainer thereby retaining said segments in lateral position, a plurality of slotted segment-fastening members located at the flared outer end of each of said projections, and means securing said fastening members to said projections to limit radial movement of said segments and thereby overcome the effect of centrifugal force which tends to throw the segments outwardly towards the wheel, said key members operatively engaging said fastening members and said flared ends in their slotted portions with a clearance being provided at all times between the key members and the bottom of the slots thereby preventing binding due to high bearing load, said flared ends transmitting both the driving force and the centrifugal force exerted by said key members and said rotor segments, respectively, to said circumferentially spaced projections.

2. A wheel and brake assembly comprising a rotating wheel, a plurality of circumferentially spaced driving keys rotatable with said wheel and substantially parallel to the axis thereof, a brake rotor, and a brake stator comprising a disc engageable with the rotor and prevented from rotation by engagement with a non-rotatable member, said brake rotor comprising a plurality of separate segments grooved at the angularly disposed edges thereof, an annular retainer with radially extending projections, said projections having flared ends which extend beyond the periphery of said segments, a slot formed in the flared end of said projections, slotted members provided on the flared ends of the projections, said segments overlapping the annular retainer and the projection but spaced sufficiently apart to permit substantially free individual expansion under the influence of heat, and means fastening said slotted member to the ends of said projection so that centrifugal force is transmitted thereto, said slotted members thereby holding said segments from radially outward movement resulting from the effect of centrifugal force, said slotted members and projections receiving the driving keys, said annular retainer, projections, segments and slotted members being structurally arranged and connected to form an integrated unit in the brake structure which can slide freely axially along the driving keys without binding resulting between the unit and the keys due to the effects of centrifugal force, said projections having a greatest cross-sectional area in the region of said flared ends through which force from said driving keys and centrifugal force from said segments is transmitted to said annular retainer 3. In a disk brake assembly having axially extending torque transmitting means, a friction disk comprising a plurality of separate segments, an annular retainer having a plurality of circumferentially spaced projections extending radially from said retainer, each of said projections having an end portion extending radially beyond the friction surface of said segments, means forming a key-and-slot drive connection including each of said end portions and said torque transmitting means, said segments being adapted to fit between said projections with clearance providing for thermal expansion, and segment-holding members mounted on the sides of each of said projections radially outwardly from said annular retainer to prevent radial displacement of the segments under the effect of centrifugal force, said segment-holding members being secured to the respective projection so that said centrifugal force is transmitted thereto without developing binding force at said key-and-slot drive connections to interfere with axial movement of said disk, said end portions providing a sufficiently large tangential cross-sectional area at said respective key-and-slot drive connections proportioned to withstand the combined effect of the forces transmitted through said key-and-slot drive connections.

4. A friction member for disk brakes comprising a flat annular retainer having circumferentially spaced radially extending projections, a plurality of disk segments having opposite friction surfaces and arranged between the projections, with said projections proportioned to extend radially beyond the friction surface of said segments, said segments each having slotted edges at the angularly disposed ends thereof which receive bordering edge of associated projections thereby retaining said segments in lateral position, said slotted ends extending over said projections with the edges of adjacent segments being relatively close together to provide a substantially continuous annular friction surface on each side of said projections, a plurality of fastening members located radially beyond said annular retainer and affixed respectively to said projections to prevent radially outward movement of said segments and so located as to be removed from the friction surfaces of said segments, and means forming key-and-slot drive connections including the portions of said projections extending beyond the friction surfaces of said segments and providing clearance for thermal expansion enabling substantially free axial movement of said friction member, said fastening members being secured to the respective projections so that centrifugal force of said segments is transmitted thereto without developing binding force at said key-and-slot connections to impede axial movement of said friction members, each of said fastening members providing a bearing surface against which adjacent edges of said segments are urged by centrifugal force.

References Cited in the file of this patent

UNITED STATES PATENTS

| | | |
|---|---|---|
| 2,033,835 | Lansing | Mar. 10, 1936 |
| 2,542,545 | Lyman | Feb. 20, 1951 |
| 2,683,504 | Martin | July 13, 1954 |

FOREIGN PATENTS

| | | |
|---|---|---|
| 171,503 | Great Britain | Nov. 24, 1921 |